(12) United States Patent  
Tse et al.

(10) Patent No.: US 9,007,946 B2
(45) Date of Patent: Apr. 14, 2015

(54) METHOD AND SYSTEM FOR CONFLICT DETECTION IN SELF ORGANIZATION NETWORK (SON) FUNCTIONS

(71) Applicants: Edwin Tse, Montreal (CA); Brendan Hassett, Loughrea (IE); Mats Buchmayer, Stockholm (SE); Robert Petersen, Linkoping (SE)

(72) Inventors: Edwin Tse, Montreal (CA); Brendan Hassett, Loughrea (IE); Mats Buchmayer, Stockholm (SE); Robert Petersen, Linkoping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 143 days.

(21) Appl. No.: 13/757,022

(22) Filed: Feb. 1, 2013

(65) Prior Publication Data

US 2013/0272149 A1    Oct. 17, 2013

Related U.S. Application Data

(60) Provisional application No. 61/595,397, filed on Feb. 6, 2012.

(51) Int. Cl.
*H04L 12/26* (2006.01)
*H04L 12/24* (2006.01)

(52) U.S. Cl.
CPC ............. *H04L 43/06* (2013.01); *H04L 43/16* (2013.01); *H04L 41/0627* (2013.01); *H04L 41/142* (2013.01); *H04L 43/0817* (2013.01); *H04L 41/0873* (2013.01); *H04L 41/0609* (2013.01); *H04L 41/0622* (2013.01); *H04L 41/048* (2013.01)

(58) Field of Classification Search
USPC .......................................... 370/252, 242, 248
See application file for complete search history.

(56) References Cited

U.S. PATENT DOCUMENTS

| 7,461,130 | B1 | 12/2008 | AbdelAziz et al. |
| 7,788,707 | B1 | 8/2010 | Zhou |
| 2002/0143494 | A1 | 10/2002 | Conrad |
| 2008/0235365 | A1* | 9/2008 | Bansal et al. ................. 709/224 |
| 2011/0122851 | A1 | 5/2011 | Gessner et al. |

OTHER PUBLICATIONS

3GPP TR 36.902, V9.3.1: 3rd. Generation Partnership Project; Technical Specification Group Radio Access Network; Evolved Universal Terrestrial Radio Access Network (E-UTRAN); Self-configuring and self-optimizing network (SON) uses cases and solutions (Release 9); 21 pages; Mar. 2011.

(Continued)

*Primary Examiner* — Mohammad Anwar
(74) *Attorney, Agent, or Firm* — Ericsson Inc.

(57) ABSTRACT

A system and method for detecting cooperation or conflict between actors in a network made up of self-organizing sub-networks examines parameters such as performance indicators and configuration parameters to determine whether or not different actors are adjusting configuration parameters in a way that is cooperative or conflicting. When a performance indicator is observed to be outside of its expected range, an acceptable convergence range can be defined to give the actors time to adjust and return the performance indicator to its expected range of values. When a performance indicator is detected to be non-convergent, the monitor can alert an operator, or another node, so that appropriate actions can be taken.

14 Claims, 11 Drawing Sheets

(56) References Cited

OTHER PUBLICATIONS

3GPP TS 32.541, V10.0.0: 3rd. Generation Partnership Project; Technical Specification Group Services and System Aspects; Telecommunication management; Self-Organizing Networks (SON); Self-healing concepts and requirements (Release 10); 21 pages; Mar. 2011.

* cited by examiner

METHOD AND SYSTEM FOR CONFLICT DETECTION IN SELF ORGANIZATION NETWORK (SON) FUNCTIONS

This application claims the benefit of priority to previously filed U.S. Provisional Patent Application No. 61/595,397 entitled "METHOD AND SYSTEM FOR. CONFLICT DETECTION IN SELF ORGANIZATION NETWORK (SON) FUNCTIONS" and filed on Feb. 6, 2012, the contents of which are incorporated herein by reference.

TECHNICAL FIELD

This disclosure relates generally to the detection of conflict between self organizing network functions.

BACKGROUND

Self organizing network (SON) functions and Self healing functions are known technologies in the field, of computer networking, architecture. Several different references teach the fundamentals of this field including U.S. Pat. No. 7,461,160 to AbdelAziz et al. entitled "Method and apparatus for self-organizing node groups on a network", U.S. Pat. No. 7,788,707 to Zhou, entitled "Self-organized network setup", and US Patent Application Publication No. US 2011/0122851 to Gessner et al. entitled "Self-Organizing Communications Network And Method For The Operation Thereof". Further information can be found in 3GPP TS 32.541 entitled "Telecommunication management; Self-Organizing Networks (SON); Self-healing, concepts and requirements".

SON and self healing techniques are designed to allow network configuration parameters (CP) to be adjusted in an automated fashion to overcome observed problems in the network. Typically this technique is performed using distributed autonomic computing processes and functions. The status and performance (which will be referred to as Performance Indicators (PI)) of the network (or subnetwork) is measured and observed (either globally or at defined nodes) and the set of CPs is dynamically adjusted to optimize the network and heal or recover from errors. Typically the CPs that are adjusted are done so to achieve certain policy goals set by the network operator.

As the complexity of mobile telecommunication networks increase, the ability of the network to heal around problems in a Long Term Evolution (LTE) based network has become highly desirable. The requirement for SON capabilities in an LTE network is defined 3GPP Release 8 technical specification RS 36.902.

A typical large telecommunication network can consist of network segments from different vendors. A node vendor would provide SON and self healing functions for its segment. Since a network segment connects with multiple other segments, different SON and self healing functions, operating in different segments and without coordination, may be competing for network resources and fail in achieving their individual goals. Each equipment vendor can adjust different configuration parameters, and often the manner in which they are adjusted to address a problem is different. This can result in divergent mechanisms of solving the same problem.

Before the SON and self healing functions can resolve a potential conflict between different segments in a network, it is necessary that they first are able to determine that a conflict is arising, or has occurred.

As noted above, conventionally a SON capability or Self Healing ion (F) monitors the status of the managed nodes and/or networks (or subnetworks), called the System. F then evaluates if the System's status satisfies a given objective or policy goal. When it does not, adjusts the relevant System's parameters. At this point, the cycle of monitoring, evaluating and adjusting begins again. For a variety of different reasons, including efficiency, cost, and being less prone to error, it is preferred by many operators that this cycle be carried out without human operator intervention.

A large System will have multiple Fs active at once. Human operators and various operational and maintenance (OAM) applications, will configure System parameters if necessary, independent of whether Fs active or not.

As noted above, a number of different problems can arise. In the absence of a coordinator, various Fs may attempt to configure a System in conflicting way e.g. various Fs attempts to configure a System parameter using different values). This results in one F modifying parameters that a second F has already adjusted to attempt to solve a problem. In the presence of a coordinator, the various Fs may also attempt to configure a System in conflicting way, if the policy or guidelines given to the Fs have conflicting goals in themselves or that the Fs are not bug-free. The configuration instruction (for parameter adjustment) as calculated by a first F, such as the one for energy saving, can conflict with the configuration instruction issued by another F, such as one that prioritizes healing a network fault. Human operator or OAM applications, managing the System, may issue configuration instruction that conflict with those issued by Fs.

The Fs, human operators and OAM applications described, above can be referred to as "Actors". If multiple Actors of conflicting goals are used, CP or PI values will oscillate. If one Actor is used, CP or PI values may also oscillate e.g. an F can either overcompensate or under compensate a System CP when F first becomes active; resulting in CP or PI values oscillating). This is a normal situation.

A problem is that operators have no confident way to know if the CP or PI values oscillation is due to Actors of conflicting goals acting on System at once, Actors having bugs or errors, or Actors acting normally.

Therefore, it would be desirable to provide a system and method that obviate or mitigate the above described problems

SUMMARY

It is an object of the present invention to obviate or mitigate at least one disadvantage of the prior art.

In a first aspect of the present invention, there is provide a method for reporting that a performance indicator, associated with a network element in a self-organizing network, is not converging towards its normal expected range. The performance indicator is monitored and it is determined, by a processor, that a first performance indicator value is outside of an expected range of values associated with the performance indicator. An acceptable convergence range of values is defined for the performance indicator, in accordance with a time period for the performance indicator to return to the expected range of values and an allowable deviation beyond the first performance indicator value. A report is generated in response to determining that a second performance indicator value is outside of the defined acceptable convergence range.

In an embodiment of the first aspect of the present invention, it is determined that the second performance indicator value is greater than the sum of the first performance indicator value and the allowable deviation. In an alternative embodiment, it is determined that the second performance indicator value is outside of the expected range associated with the performance indicator following the expiration of the time period.

In another embodiment, the method can include continuing to monitor the performance indicator in response to determining that a third performance indicator value is within the expected range associated with the performance indicator. In an alternative embodiment, the method can include continuing to monitor the performance indicator in response to determining that a third performance indicator value is within the defined acceptable convergence range.

In another embodiment, the allowable deviation is a variable value. The allowable deviation value can be decreased over the time period.

In another embodiment, the defined, acceptable convergence range can be defined to converge to the expected range associated with the performance indicator following the expiration of the time period.

In another embodiment, the step of monitoring can include receiving, by a communication interface associated with a monitoring function, a measurement of the first performance indicator value.

In a second aspect of the present invention, there is provided a monitoring node, comprising a communication interface and a processing engine. The communication interface is configured for receiving a first performance indicator value and a subsequent second performance indicator value. The processing engine is configured for determining that the first performance indicator value is outside of an expected range of values associated with the performance indicator. The processing engine defines an acceptable convergence range of values in accordance with a time period for returning to the expected range and an allowable deviation beyond the first performance indicator value. The processing engine is configured to instruct the communication interface to transmit a report in response to determining that the second performance indicator value is outside of the defined acceptable convergence range.

In an embodiment of the second aspect of the present invention, the processing engine instructs the communication interface to transmit a report in response to determining that the second performance indicator value is greater than the sum of the first performance indicator value and the allowable deviation. In an alternative embodiment, the processing engine instructs the communication interlace to transmit a report in response to determining that the second performance indicator value is insure of the expected range associated with the performance indicator following the expiration of the time period.

In another embodiment, the allowable deviation is a variable value. The allowable deviation value can be decreased over the time period.

In another embodiment, the processing engine defines the acceptable convergence range to converge to the expected range associated with the performance indicator following the expiration of the time period.

In another embodiment, the monitoring node can further include a memory for storing the expected range of values associated with the performance indicator and the defined acceptable convergence range of values.

Other aspects and features of the present invention will become apparent to those ordinarily skilled in the an upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

The present invention is directed to a system and method for detecting conflicts between two or more different self-organizing and self-healing network functions.

Reference may be made below to specific elements, numbered in accordance with the attached figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

A System in general can be characterized by its configuration parameters (CPs) and performance indicators (PIs) Some examples of CPs include handover thresholds; power settings; parameters impacting Radio resource management (RRM) processes, Physical channel (PCH) resource settings, Radio access channel (RACH) related parameters, Frequencies (e.g. E-UTRA Absolute Radio Frequency Channel Number (EARECN)), Physical Cell id (pci). Public land mobile network ID (plmnIdList), Tracking Area Code (TAC). Examples of PIs for LTE include Accessibility, Retainability, Integrity, Availability and Mobility. Some examples of PIs include Connection Establishment Attempts and Connection Establishment Successful on different interfaces, Cell Unavailability Time, Handover Attempts and Handover Successes, etc.

A policy goal can be expressed as a set of PI values, it will be assumed that the network operator has a set of desired PI values, or that the network operator knows the appropriate or correct values for each given PI. The operator assumes that the Actors will act to configure the System in ways that those expected PI values be achieved. To ensure that this is the case, a monitoring function (Monitor M) can be introduced to determine whether the operator's assumption is correct or not.

The network operator, having a number of different PIs and a number of different Actors, can introduce the Monitor (M) to accept, from M's client (hereafter called the client), specific System PIs normal expected values over time. This is termed the expected range of the PI. Additionally, M can be used to monitor the values of the identified PIs to determine if they are outside the bounds defined by the expected range. If an observed PI value is outside of the expected range, M will notify its client of the situation (e.g. by transmitting a warning or an alert).

One skilled in the art will appreciate that the response from a client to a warning can be decided in a number of different ways, and is not germane to the manner in which the warning is generated. Although M is discussed as a stand alone entity, one skilled in the art will appreciate that M can be embedded in a number of different nodes including both F or within an operational and maintenance system. The use of an expected range can be applied to other types of parameters other than PI as discussed here as long as the operator have an expectation of the values of the parameter under consideration.

The network operator can also define an acceptable oscillation pattern (AOP) for a PI. An AOP allows the Monitor to determine if Actors, affecting the values of PIs and CPs, are acting cooperatively or in conflict with one another. The PI and CP values can be monitored to determine if convergence to an acceptable set of values is underway. Typically, the operator can assume that the Actors will configure the System appropriately. Instead of requiring the Monitor and/or the operator to know the correct values to which the CPs should be configured, the Monitor can use the AOP to determine if the assumption that the Actors will configure the CPs properly is correct or not.

Monitor (M) can be used to measure the magnitude of the oscillation (of the observed CP values) against a client's given maximum value. If the former is greater than the latter, M notifies the client of the situation (e.g. the Actors are not likely working cooperatively in terms of setting the CP to an appropriate value).

If an observed PI value is outside of the expected range, but within the defined AOP range, the Monitor is not required to inform the client. This can allow the network sufficient time to self-heal, or self-organize, and allow the PIs to converge to the acceptable range of values without requiring operator intervention.

A System's PI, which is sometimes known as a counter or a key performance indicator, can be used to reveal a certain aspect of the System's behavior. Regardless of whether the System is managed manually, managed by Fs, or by a combination of the two, the operator can have two kinds of expectations regarding the PI value. First, there is an expectation that the PI will be within a defined expected range (called E PI) reflecting correct System behavior. Second, when the PI value starts to deviate from (e.g. falls outside the expected range of) E PI, the operator can expect that the Fs or human operators will take remedial actions to system configuration values so that the subject PI value will fall back within the range of E PI in a specified time period.

Figure 1:
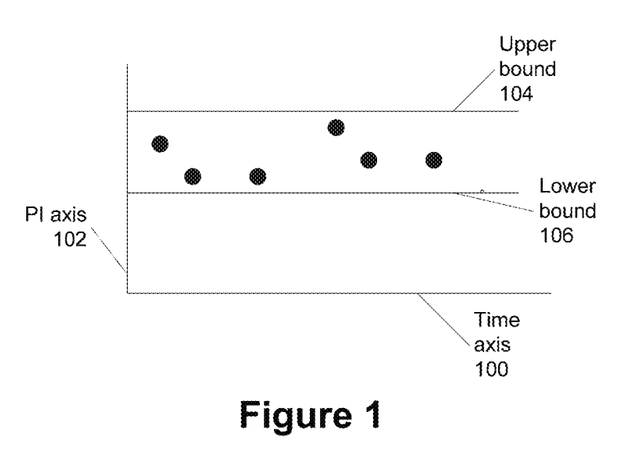
FIG. 1 is a graph illustrating expected values for PI-type-1.
Figure 2:
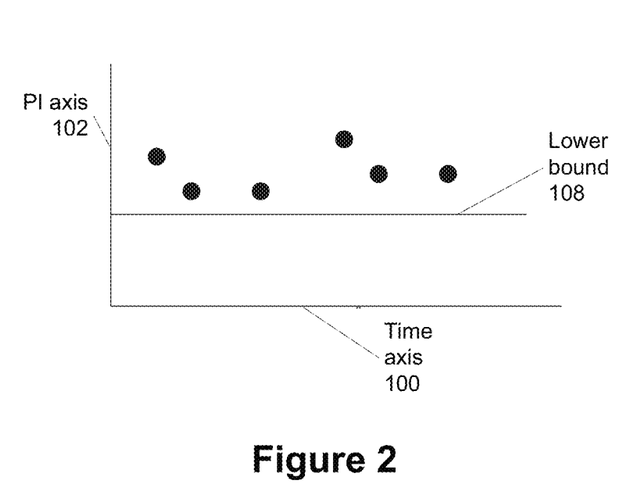
FIG. 2 is a graph illustrating expected values for PI-type-2.
Figure 3:
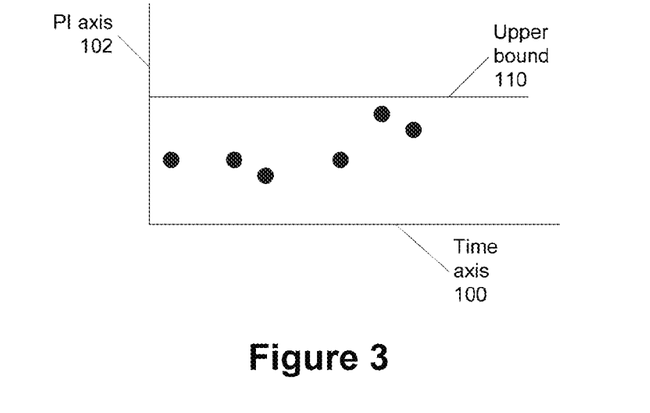
FIG. 3 is a graph illustrating expected values for PI-type-3.

There are three exemplary types of PIs depicted by FIGS. 1, 2 and 3. The observed PI values (i.e. the dots) are plotted on a graph having a horizontal axis 100 measuring time and a vertical axis 102 measuring the PI value.

FIG. 1 is a graph illustrating the expected range of values for a first type of PI (PI-type-1). The operator's expectation for PI-type-1 is that all observed PI values should be within the upper bound 104 and the lower bound 106 over time. FIG. 2 is a graph illustrating the expected range of values for a second type of PI (PI-type-2). The operator's expectation for the PI-type-2 is that all observed PI values should be above the lower bound 108 over time. FIG. 3 is a graph illustrating the expected range of values for a third type of PI (PI-type-3). The expectation for PI-type-3 is that all observed PI values should be below the upper bound 110 over time.

In performing an analysis of the operation of the SON, and the likelihood that the Fs will cause convergence, M's client can identify a list of PIs. The PIs will vary over time, and when there is convergence, the variations will fall within an acceptable range or AOP. For each PI identified, the client defines its AOP according to PI type. In one embodiment, an AOP starts at the first observed deviation of a PI value. The operator, as noted above, will know or have defined the acceptable or correct PI values.

Figure 4:
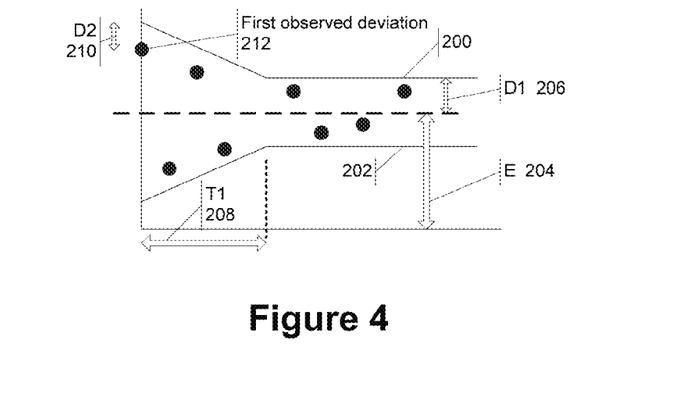
FIG. 4 is a graph illustrating an AOP for PI-type-1.

FIG. 4 illustrates an example AOP for PI-type-1. The upper and lower bounds, 200 and 202, are defined by E 204, the operator's expected value for the PI, and D1 206, the allowable deviation above or below E. The value T1 208 is the time allowed for the PI values to fall back within the expected range for the PI. D2 210 is the extra deviation deemed acceptable, relative to the first observed deviation 212. The bounds 200 and 202 of this AOP allow an observed deviation to converge to the expected range of PI within the time period T1 208. This example AOP is symmetrical in relation to the axis defined by IF. 204.

Figure 5:
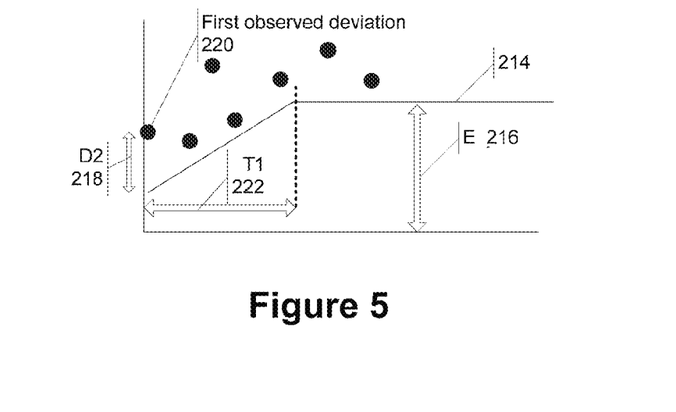
FIG. 5 is a graph illustrating an AOP for PI-type-2.

FIG. 5 illustrates an example AOP for PI-type-2. The lower bound 214 is defined by the expected value E 216. D2 218 is the extra deviation deemed acceptable, relative to the first observed deviation 220. The value T1 222 is the time allowed for the PI values to converge to being, above the lower bound 214.

Figure 6:
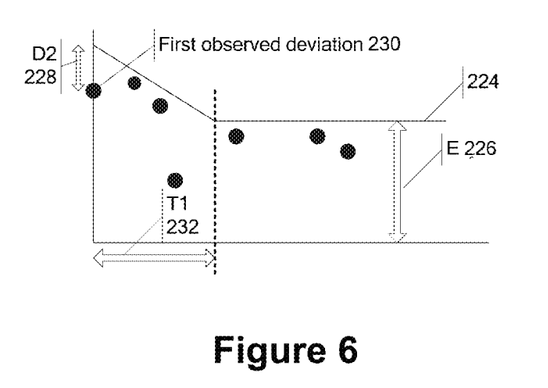
FIG. 6 is a graph illustrating an AOP for PI-type-3.

FIG. 6 illustrates an example AOP for PI-type-3. The upper bound 224 is defined by the expected value E 226. D2 228 is the extra deviation deemed acceptable, relative to the first observed deviation 230. The value T1 232 is the time allowed for the PI values to converge to being below the upper bound 224.

Figure 7:
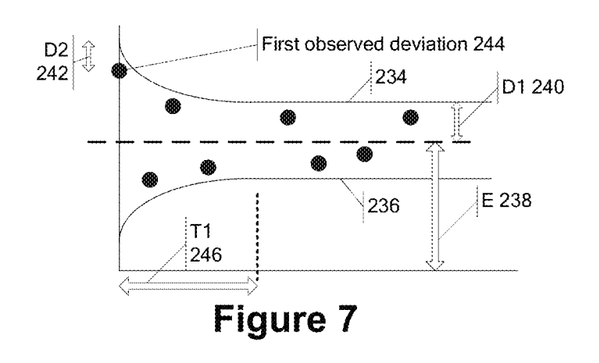
FIG. 7 is a graph illustrating a parabolic AOP for PI-type-1.

The three exemplary AOPs discussed above with relation to FIGS. 4-6 are appropriate for PIs where client would expect a linear improvement of PI value (moving from deviated values to appropriate values) over the time period T1. Alternatively, there are PIs where the client would expect a non-linear improvement of PI values. Take the example of PI values reflected in FIG. 1, but where the client expresses an expectation that the improvements would follow a parabolic equation. FIG. 7 illustrates one exemplary form of a parabolic equation. Similar to as discussed with respect to FIG. 4, the upper and lower bounds, 234 and 236, are defined by the expected value E 238 and the allowable deviation D1 240. D2 242 is the extra deviation deemed acceptable, relative to the first observed deviation 244. The value T1 246 is the time allowed for the PI values to fall back within the expected range for the PI. This form expresses its expectation that improvement is high at the beginning of T1 246.

The use of a parabolic equation to express expectation of improvement of PI value is applicable to all three types of PI described herein. Further illustrations of parabolic bounds are omitted for the purposes of a compact discussion, though they would be well understood by those skilled in the art.

Figure 8:
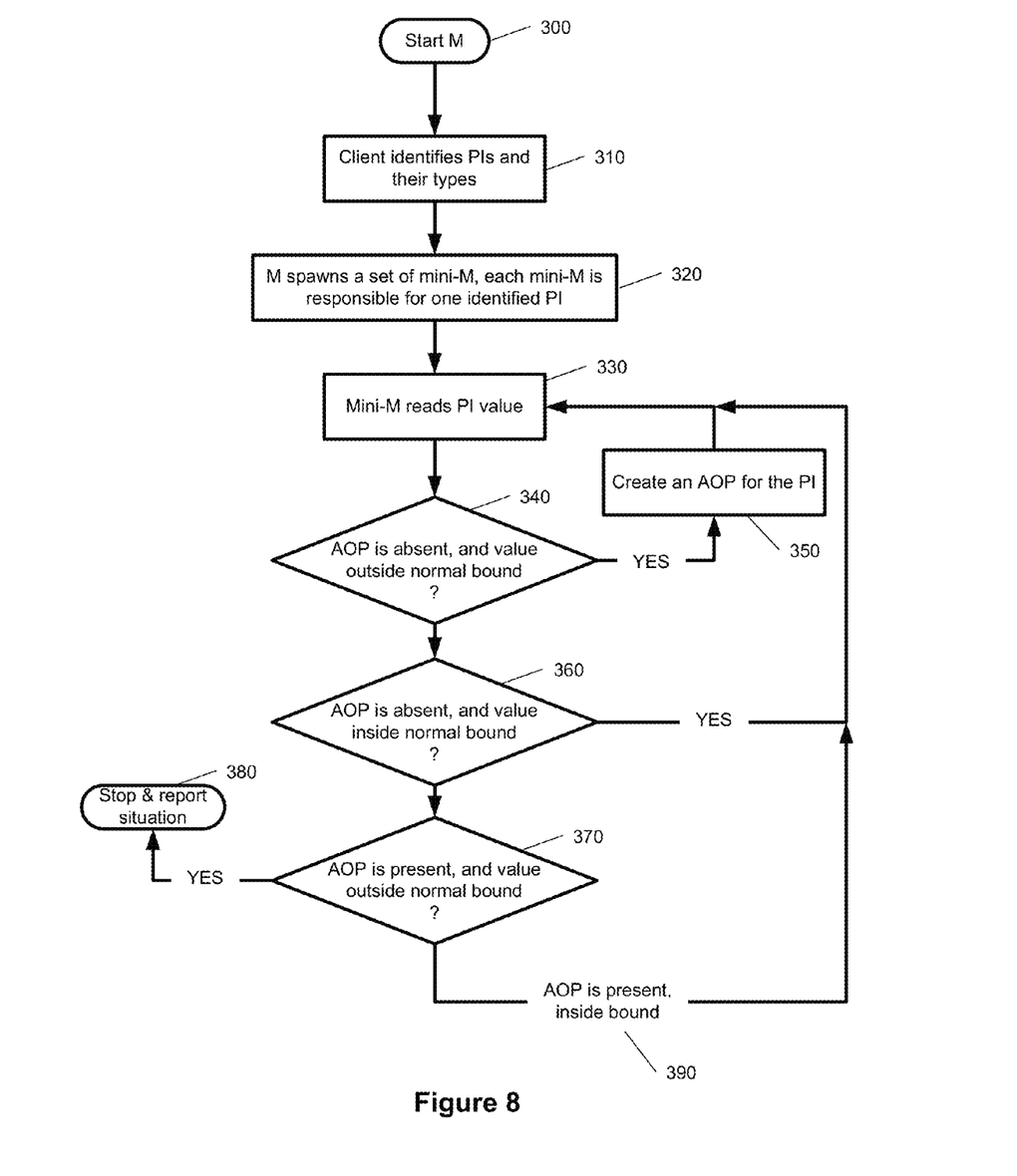
FIG. 8 is a flowchart illustrating an exemplary embodiment of a method for detecting conflicts.

FIG. 8 is a flow chart illustrating an exemplary method of detecting inter-SON conflicts using AOPs and PIs as discussed above. The process commences with the initialization of the monitor M (block 300). The client identifies the PIs to be monitored, the type of PI(s), and any parameters required for creating an AOP (block 310) The client can supply parameters T1, E, D1 and D2 for a PI-type-1; parameters T1, E, D2 for PI-type-2 and PI-type-3. The monitor M can then spawn a set of mini-M where each mini-M is responsible for monitoring one RI identified (block 320). In an alternate embodiment, a single M process monitors the set of PIs, the manner in which this differs in operation from the disclosed matter will be clear to those skilled in the art. The instantiated mini-M then reads the PI value (block 330). In block 340 it is determined if an AOP is absent and the value of the PI is outside the normal bound (e.g. data points illustrated in FIG. 1: Expected values for PI-type-1, FIG. 2: Expected values for PI-type-2 and FIG. 3: Expected values for PI-type-3), M creates an AOP for the PI (block 350) and the process returns to reading the PI value (block 330). If the AOP is absent and the value is inside the normal bound (block 360), the process also returns to reading the PI value (block 330).

In block 370 it is determined if an AOP has been created and is present for the PI, and the value is outside the AOP bound (e.g. data points illustrated in FIG. 4: AOP for PI-type-1, FIG. 5: AOP for PI-type-2 and FIG. 6: AOP for PI-type-3) the situation is reported to the client (block 380). The process may optionally terminate at this point (as illustrated), or it could return to reading the PI (not illustrated). If the AOP is present and the value is inside the AOP bound (block 390), then it can be assumed that the process is operating properly, and returns to reading the PI (block 330).

Figure 9:
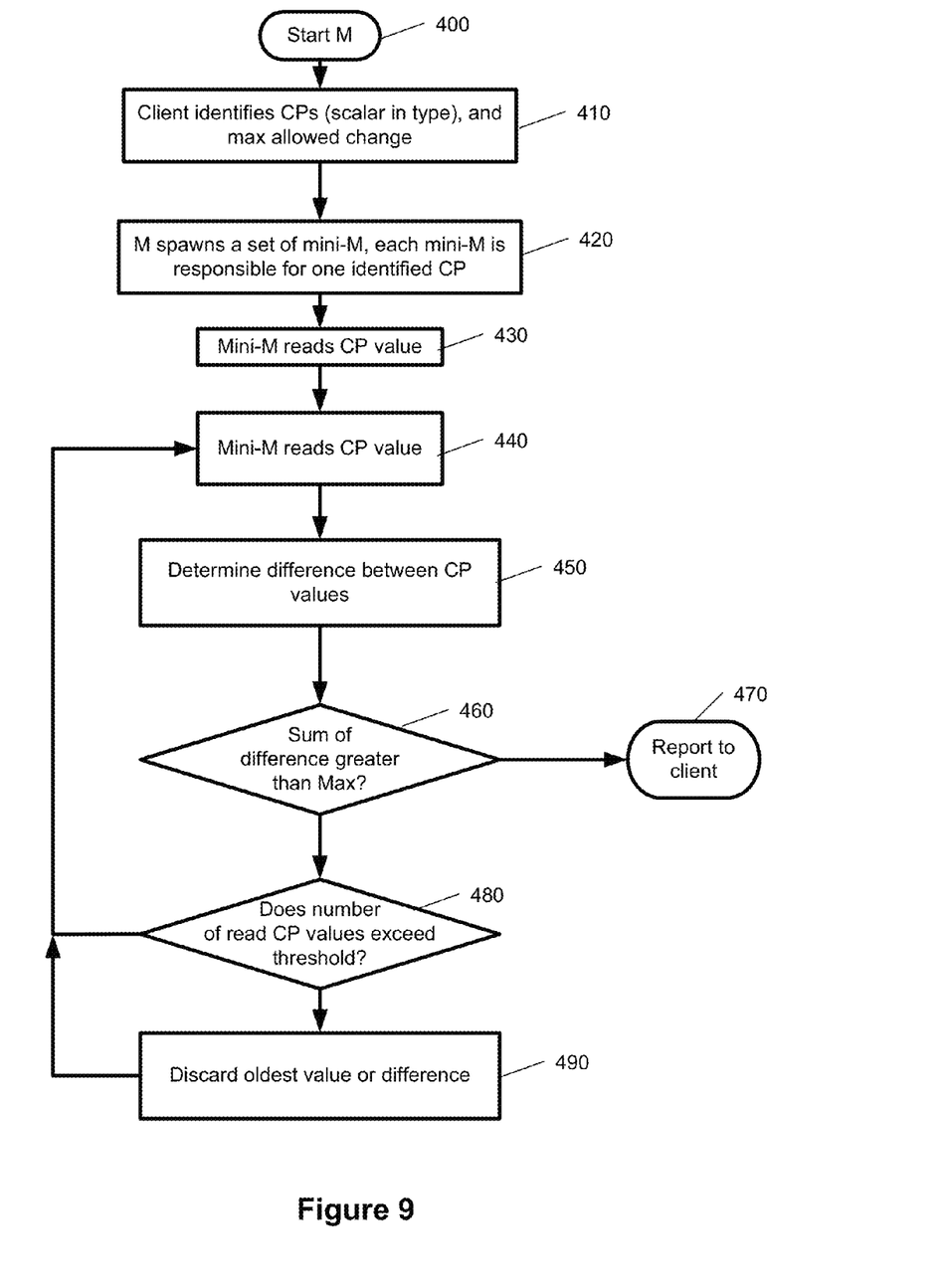
FIG. 9 is a flowchart illustrating an exemplary embodiment of a method for detecting conflicts.

One skilled in the art will appreciate that a system's behavior is controlled by setting the values of the System's configuration parameters (e.g., antenna-tilt, transmission power and antenna bearing). To detect a conflict between the setting of these values, the following process can be undertaken as illustrated in FIG. 9. To commence, a monitor, M, is instantiated (block 400). The client identifies the CPs (block 410). For this example, the CPs will be scalar values. The client supplies the maximum allowed change of the CP value, referred to as Max, within a specified time period, defined as a number (N) of intervals of T unit of time. The monitor M then spawns a set of mini-M where on mini-M is responsible for monitoring one CP identified (block 420). One skilled in the art will appreciate that as discussed above the use of mini-Ms is a design choice, and it would be equally possible to use a different number of Ms. The mini-M reads the relevant CP value (block 430). At the next time interval, it reads the new CP value (block 440). It then calculates the difference between the new CP value and the previous one (block 450). If the sum of all differences calculated over N intervals exceeds the Max value (block 460), the situation is reported to the client (block 470). Optionally the process stops at this point. If the number of intervals exceeds N (block 460), the monitor discards the difference of the oldest interval (block 490) and returns to reading a new CP value (block 440).

Figure 10:
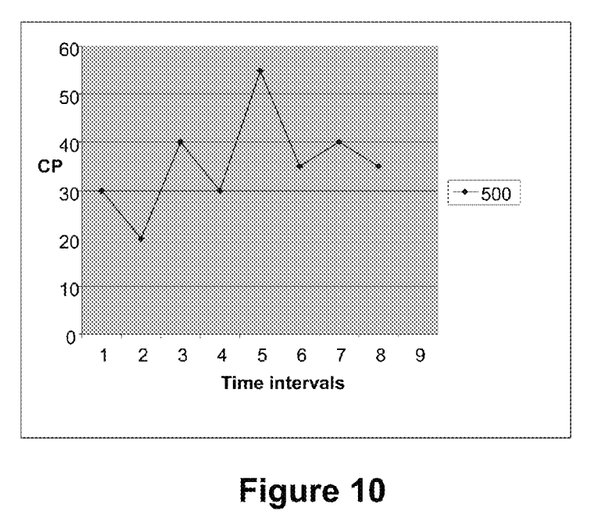
FIG. 10 is a graph illustrating an exemplary operation of the method of FIG. 9.

FIG. 10 is a graph illustrating an exemplary operation of the method of FIG. 9. In this example N=7. The observed CP values 500 are plotted with respect to time. The differences observed at each of the seven intervals are 10, 20, 10, 25, 20, 5 and 5 giving a total of 95. If the Max is greater than 95, the monitor will discard the oldest difference, i.e. 10 and will read at interval 9: total the sum of differences again and check against the Max. If the Max is less than 95, the monitor will report to the client.

Figure 11:
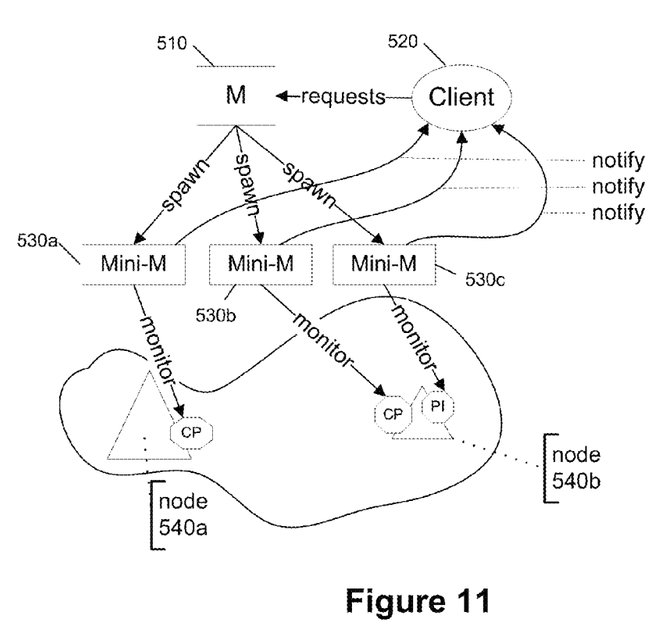
FIG. 11 is a block diagram illustrating the interaction of elements of a system of the present invention.

FIG. 11 is a block diagram of an example system. The system is a collection of nodes under management, which can be referred to network or subnetwork. An example is a wireless access network. Monitor M 510 is the monitoring function or logical entity which can be physically located at a single node in the network or can be geographically distributed in the network. The Client 520 is the entity e.g. a network operator) that interacts with Monitor 510. Mini-Ms 530a, 530b, 530c represent the monitoring functions created by the Monitor 510 for specific PIs, as previously described. Nodes 540a and 540b are the system elements monitored by Monitor 510 and/or the Mini-Ms 530a-c, Examples of nodes include radio base stations or switches. Each node 540a and 540b can have configuration parameters CPs and performance indicators PIs. The Client 420 sends a request to the Monitor 510 to observe particular CPs and/or PIs. The Monitor 510 can create a number of Mini-Ms 530a-c to read the values of the CP or PI under its responsibility. A Mini-M 530a-c will notify the Client 520 when it detects an error (e.g. an observed PI value is outside the AOP bound).

Implementations of the above described method and corresponding system can be used in a multi-vendor environment. The entity that provides the services of the Monitor M need not be one of the providers of any of the SON network subsets (i.e., the System needs not be vendor of the SON capabilities, nor the vendor of the managed nodes involved.) It should also be understood that the functionality of the Monitor M can be embedded within a node internal to one of the SON networks, within a node subject to a plurality of different SON networks, or outside of any of the SON network segments.

Figure 12:
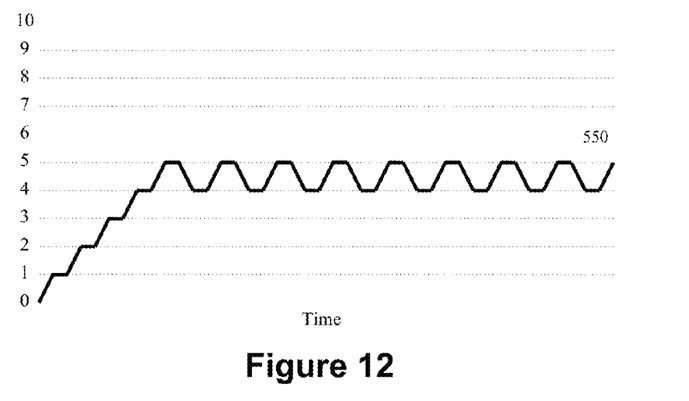
FIG. 12 is a graph illustrating the interaction of competing actors on a single value.

A set of exemplary graphs will now be discussed to illustrate the expected oscillation patterns that can occur in a system controlled by conflicting automated actors. FIG. 12 shows a typical scenario where two actors are attempting to adjust the same parameter 550. In this case, one actor wishes to set the parameter to value "4", while the other actor wishes to set the parameter to value "5".

Figure 13:
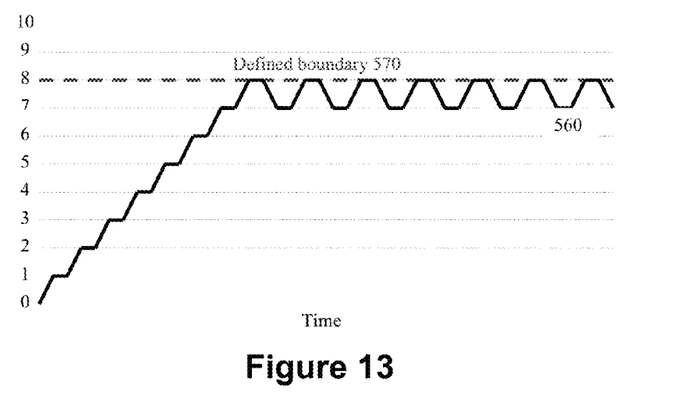
FIG. 13 a graph illustrating the interaction of competing actors on a single value.

FIG. 13 shows a scenario where two actors are attempting to adjust the same parameter 560, and a defined boundary 570 (e.g. maximum value that is allowed to be set) exists. In this case, one actor wishes to set the parameter to value "6", while the other actor wishes to set the parameter to value "10".

Figure 14:
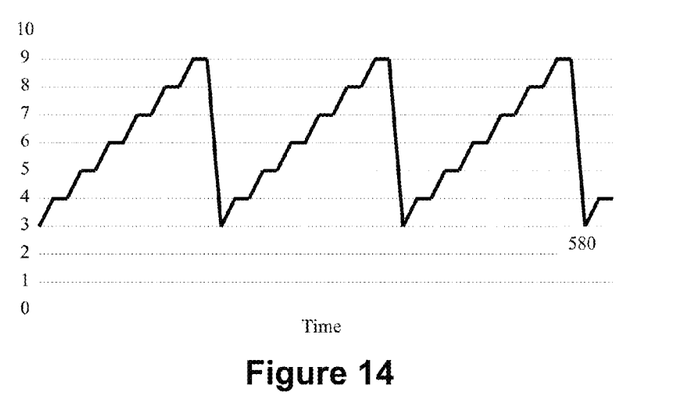
FIG. 14 a graph illustrating the interaction of competing actors on a single value.

FIG. 14 shows a scenario where two actors are attempting to adjust the same parameter 580, and are operating on different timescales. In this case, one function wishes to set the parameter to value "10" and may increment the value every 10 minutes, while the other actor wishes to set the parameter to value "3" and can set the value once per hour.

Figure 15:
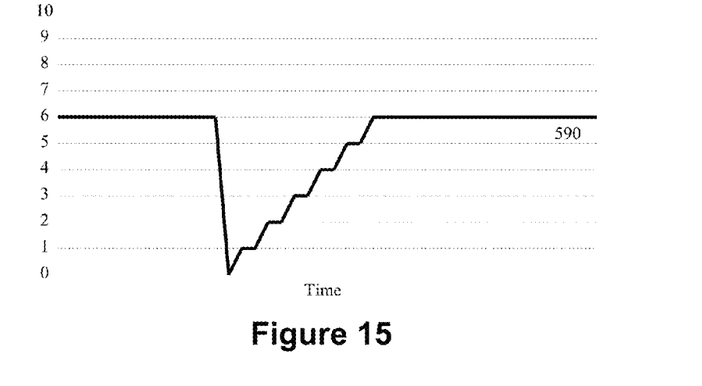
FIG. 15 a graph illustrating the interaction of competing actors on a single value.

FIG. 15 shows a scenario where an actor is controlling a parameter 590, and an external influence changes the value of the parameter 590. In this case, the actor wishes to set the parameter to value "6", while a human operator sets the parameter to value "0".

The parabolic functions, first described with respect to FIG. 7, will now be described in further detail. In a standard definition of a parabola, one requires a given point, referred to as the focus, and a directrix (a corresponding line on the plane). The locus of points in the plane that are equidistant from the focus and the directrix is defined as a parabola. Based on FIG. 7, FIG. 16 identifies two parabolas—Parabola 1 600 and Parabola 2 602.

Figure 16:
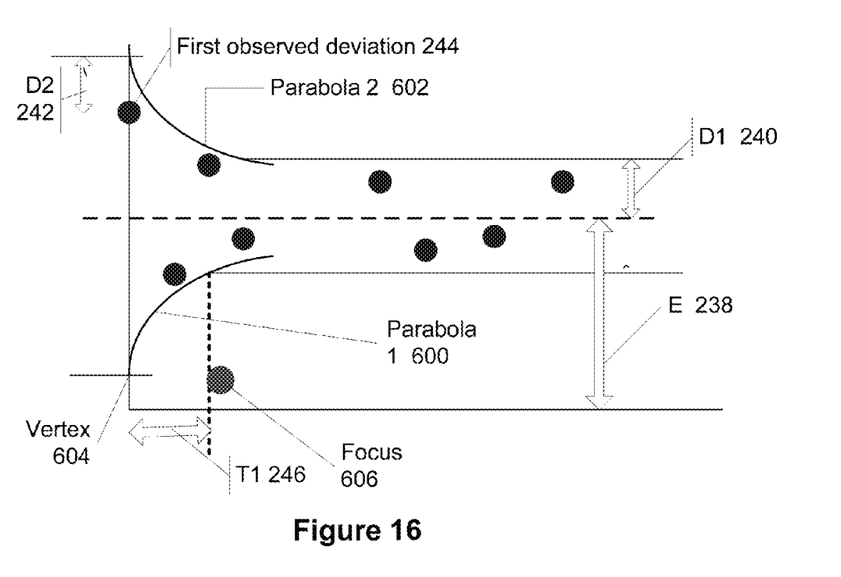
FIG. 16 illustrates the horizontal axis of symmetry between parabolas in an exemplary AOP.

For parabola 1 602, the first observed deviation 244 plus the allowable D2 deviation 242 is at (0, K). Then, the Vertex 604 is at (0, 2E K). Client can provide M with D2, D1 plus the focal radius 606 in terms of the unit of X-axis, to complete the Parabola 1 600 definition. Client does not need to provide T1 246 (whose value is the intercept of parabola 1 and axis E-D1). The Parabola 2 602 is a reflection of Parabola 1 600 and the focal radius for Parabola 1 600 and Parabola 2 602 are identical; therefore the client can provide only one focal radius.

The above form of parabolic equation allow client to express his expectation that improvement is high at the beginning of T1 246. This form is called "horizontal axis of symmetry". The Vertex 604 and Focus 606 form a horizontal line.

Figure 17:
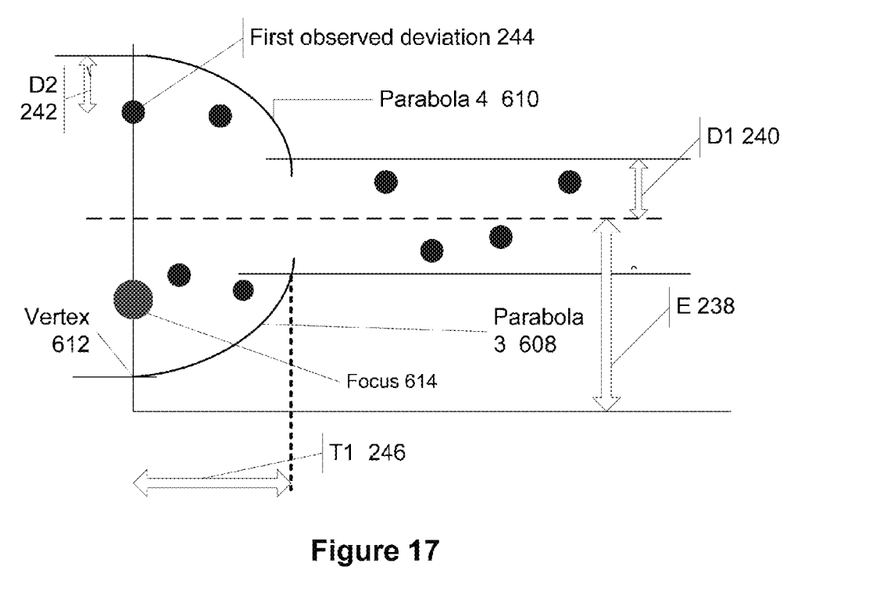
FIG. 17 illustrates the vertical axis of symmetry between parabolas in an exemplary AOP.

Another form, called "vertical axis of symmetry" allows client to express his expectation that improvement is low at the beginning of T1 246. One such example of a vertical axis of symmetry is shown in FIG. 17.

For parabola 3 608, using; the same sample, the first observed deviation 244 plus the allowable D2 deviation 242 is at (0, K). Then, the Vertex 612 is (0, 2E-K). The Client provides M with D2, E, D1 plus the local radius 614 in terms of unit of the Y-axis. Client does not need to provide T1 246 (whose value is the intercept of parabola 3 608 and axis E-D1) In this form, the Vertex 612 and Focus 614 form a vertical line. The Parabola 4 610 is a reflection of Parabola 3 608 and the focal radius for Parabola 3 608 and Parabola 4 610 are identical; therefore the client can provide only one focal radius 614.

Figure 18:
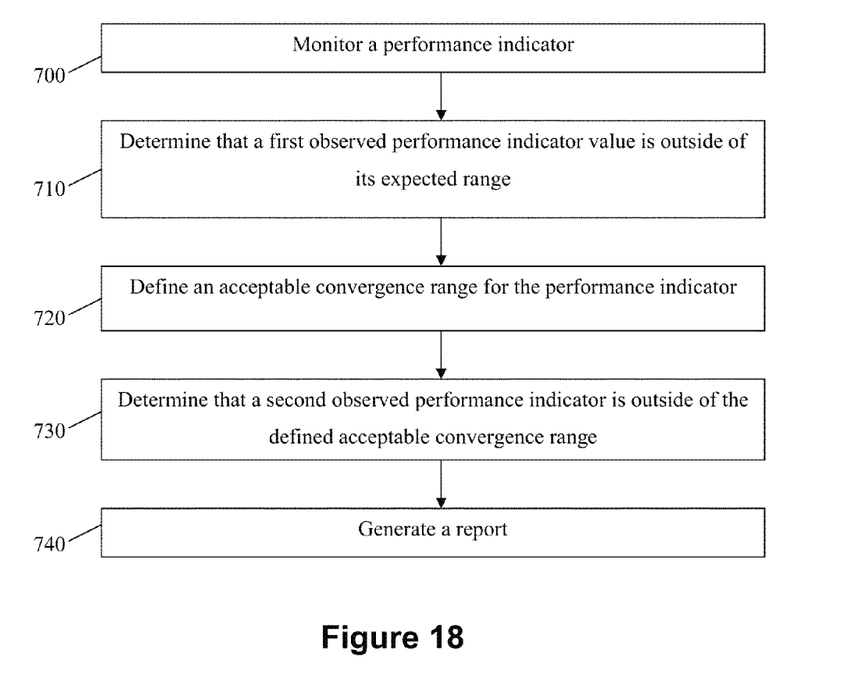
FIG. 18 is a flow chart illustrating an embodiment of the present invention.

FIG. 18 is a flow chart illustrating an embodiment of the present invention. The process begins in step 00 by monitoring a performance indicator. Step 700 can be performed in response to receiving a request from a manager or a client. The request can optionally indicate a specific node and or parameter for monitoring. In step 710, it is determined that a first observed performance indicator value is outside of its expected range. The expected range of values associated with the performance indicator can be preconfigured or it can be received from the client.

An acceptable convergence range of values is defined in step 720 for the performance indicator. The acceptable convergence range can be defined in accordance with a time period for the performance indicator values to return to the expected range and an allowable deviation, beyond the first observed performance indicator value, during that time period. The convergence range can be defined as a linear function or a parabolic function. The acceptable convergence range can be defined to converge to the normal expected range associated with the performance indicator following the expiration of the time period. In an optional embodiment, the allowable deviation can be set as a variable value which can decrease throughout the duration of the time period.

In step 730, it is determined that a second observed performance indicator value is outside of the acceptable convergence range. This can include determining that the second PI value is greater than the sum of the first PI value and the allowable deviation. This can also include determining that the second PI value is outside of the expected range associated with the performance indicator following the expiration of the time period.

In response to determining that the second PI value is outside of the defined acceptable convergence range, a report is generated in step 740. The generated report can be transmitted to the client.

In an optional embodiment, not shown in FIG. 18, a third PI value can be observed. In response to determining that the third PI value is within the expected range associated with the performance indicator, the process can return to step 700 and continue to monitor the performance indicator response to determining that the third PI value is within the defined acceptable convergence range, the process can also return to step 700 and continue to monitor the performance indicator.

One skilled in the art will appreciate that monitor M can be provided, as a function to be executed on a general purpose computing platform, including a distributed computing platform. Monitor M may include a number of functional elements that can be used to perform the functions discussed above, including an element to measure or read values, an element to determine if the read values fall within bounds, as well as functional elements to set the bounds and determine the values as functions of read values. Based on the operation of the above described functional elements, reporting and alert functional elements may be invoked. One skilled in the art will appreciate that the functional elements can be implemented using software executed on general purpose hardware, specialized hardware designed specifically for the purpose, firmware executed by hardware and a combination of any of the above.

Figure 19:
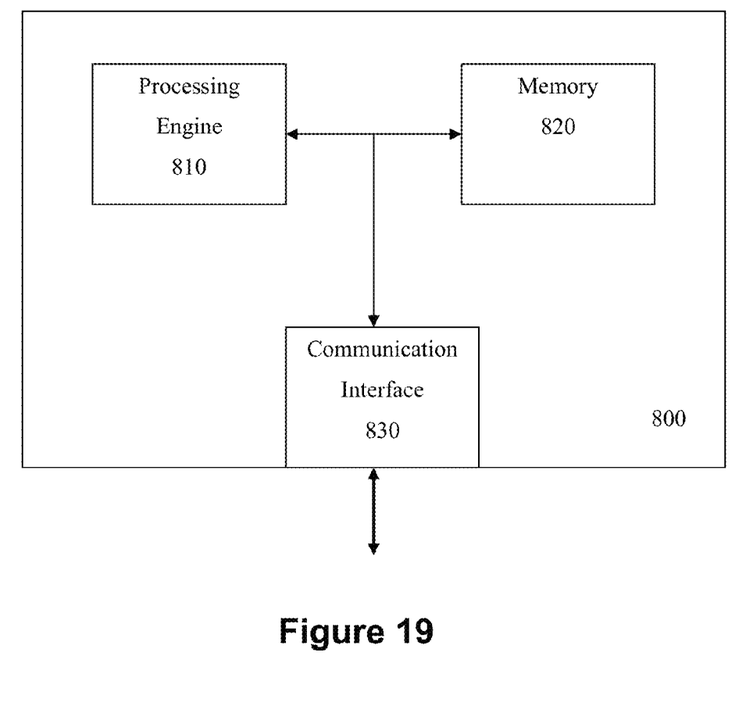
FIG. 19 is a block diagram illustrating an exemplary monitoring node.

FIG. 19 is a block diagram illustrating an example monitoring node 800, including a processor or processing engine 810, a memory 820 and a communication interface 830. The node 800 can be implemented using dedicated underlying hardware or, alternatively, can be implemented as a virtual machine. The node 800 can perform the various embodiments, as described herein, related to reporting configuration parameters or performance indicators outside of their acceptable ranges of operation. The node 800 can perform these operations in response to a processing engine 810 executing instructions stored in a data repository such as memory 820. The instructions can be software instructions and the data repository can be any logical or physical computer-readable medium. The node 800, though shown in FIG. 19 as a single entity, can be implemented by a number of different devices that are geographically distributed.

The communication interface 830 is configured to receive PI values from at least one external network node or element. The processing engine 810 is configured to monitor the received PI values and compare them to expected values associated with the performance indicator and to take appropriate action based on that comparison.

The processing engine 810 determines that a first observed PI value is outside of an expected range of values associated with the performance indicator. The expected range of values for the performance indicator can be stored in the memory 820. The processing engine 810 defines an acceptable convergence range of values for the performance indicator. The acceptable range can be defined in accordance with a time period for returning to the expected range and an allowable deviation beyond the first performance indicator value. When the communication interface 830 receives a subsequent second PI value, the processing engine 810 determines if the second PI value is outside of the defined acceptable convergence range. If yes, the processing engine 810 instructs the communication interface 820 to transmit a report indicating the second PI value is out of the acceptable range.

The processing engine 810 can instruct the communication interface 830 to transmit a report in response to one of determining that the second performance indicator value is greater than the sum of the first performance indicator value and the allowable deviation, or determining that the second performance indicator value is outside of the expected range associated with the performance indicator following the expiration of the time period.

In some embodiments, the memory 820 can store the expected range of values associated with the performance indicator and the defined acceptable convergence range of values. The memory 820 can also be configured to store the received first and second performance indicator values.

Embodiments of the invention may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for reporting that a performance indicator, associated with a network element in a self-organizing network, is not converging towards its normal expected range, comprising:
   monitoring a performance indicator;
   determining, by a processor, that a first performance indicator value is outside of an expected range of values associated with the performance indicator;
   defining an acceptable convergence range of values in accordance with a time period for the performance indicator to return to the expected range of values and an allowable deviation beyond the first performance indicator value, the acceptable convergence range converges to the expected range associated with the performance indicator following the expiration of the time period; and
   generating a report in response to determining that a second performance indicator value is outside of the defined acceptable convergence range.

2. The method of claim 1, further comprising determining that the second performance indicator value is greater than the sum of the first performance indicator value and the allowable deviation.

3. The method of claim 1, further comprising determining that the second performance indicator value is outside of the expected range associated with the performance indicator following the expiration of the time period.

4. The method of claim 1, further comprising the step of continuing to monitor the performance indicator in response to determining that a third performance indicator value is within the expected range associated with the performance indicator.

5. The method of claim 1, further comprising the step of continuing to monitor the performance indicator in response to determining that a third performance indicator value is within the defined acceptable convergence range.

6. The method of claim 1, wherein the allowable deviation is a variable value.

7. The method of claim 6, wherein the allowable deviation value is decreased over the time period.

8. The method of claim 1, wherein the step of monitoring includes receiving, by a communication interface associated with a monitoring function, a measurement of the first performance indicator value.

9. A monitoring node, comprising:
   a communication interface for receiving a first performance indicator value and a subsequent second performance indicator value;
   a processing engine for determining that the first performance indicator value is outside of an expected range of values associated with the performance indicator; for defining an acceptable convergence range of values in accordance with a time period for returning to the expected range and an allowable deviation beyond the first performance indicator value, the acceptable convergence range converging to the expected range associated with the performance indicator following the expiration of the time period; and for instructing the communication interface to transmit a report in response to determining that the second performance indicator value is outside of the defined acceptable convergence range.

10. The monitoring node of claim 9, wherein the processing engine instructs the communication interface to transmit a report in response to determining that the second performance indicator value is greater than the sum of the first performance indicator value and the allowable deviation.

11. The monitoring node of claim 9, wherein the processing engine instructs the communication interface to transmit a report in response to determining that the second performance indicator value is outside of the expected range associated with the performance indicator following the expiration of the time period.

12. The monitoring node of claim 9, wherein the allowable deviation is a variable value.

13. The monitoring node of claim 9, wherein the allowable deviation value is decreased over the time period.

14. The monitoring node of claim 9, further comprising a memory for storing the expected range of values associated with the performance indicator and the defined acceptable convergence range of values.

* * * * *